July 24, 1956  F J. SCHORDINE  2,755,637
REFRIGERATION SYSTEM
Filed May 13, 1955
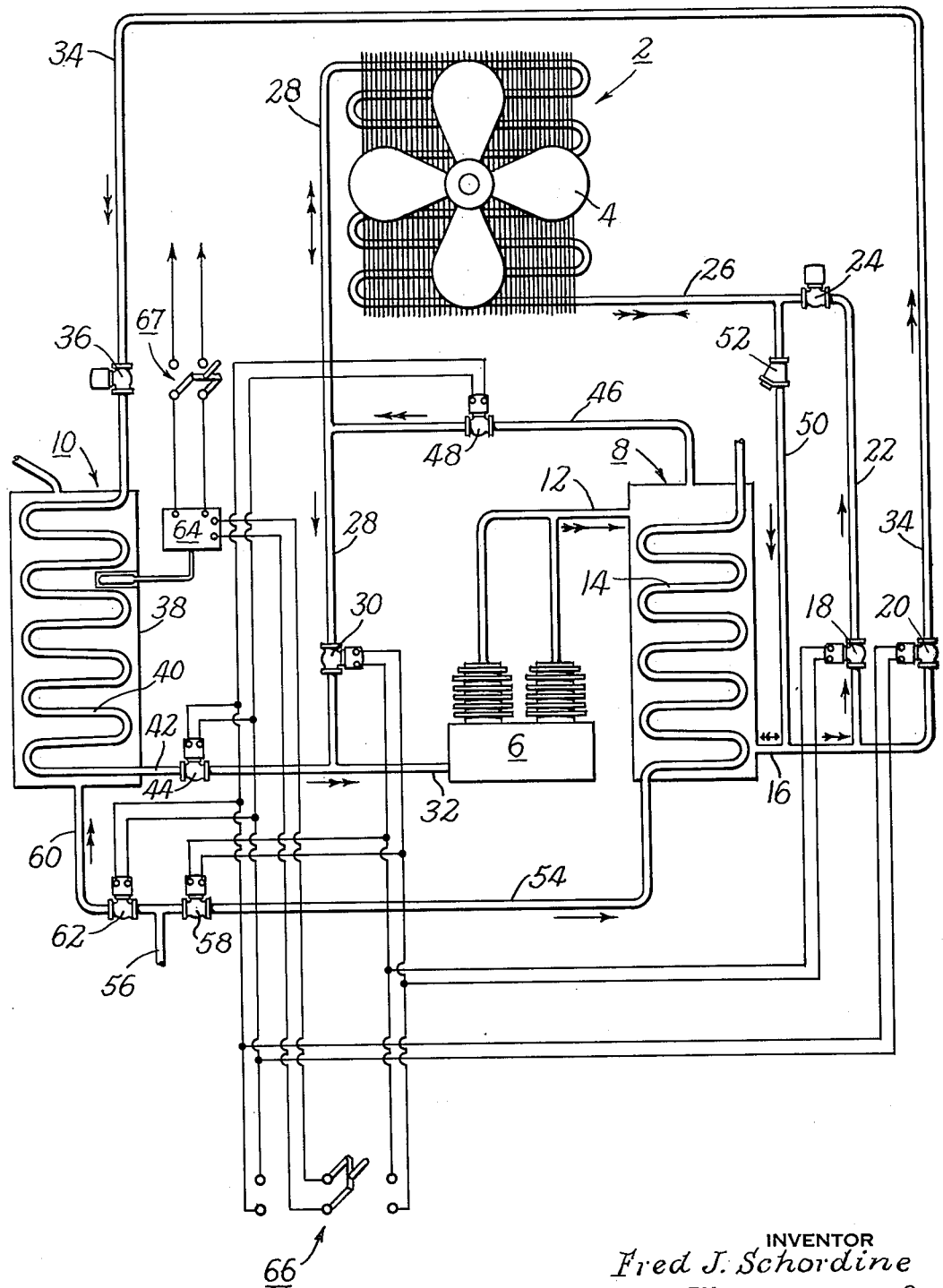
INVENTOR
*Fred J. Schordine*
BY
*Curtis Morris & Safford*
ATTORNEYS

United States Patent Office 2,755,637
Patented July 24, 1956

2,755,637

REFRIGERATION SYSTEM

Fred J. Schordine, Patchogue, N. Y.

Application May 13, 1955, Serial No. 508,048

4 Claims. (Cl. 62—115)

This invention relates to air conditioning and heat pump systems, and more in particular to such a system which is adapted for heating a conditioned space in cold weather and cooling the condiitoned space in hot weather, with fully automatic operation and maximum efficiency at all times.

An object of this invention is to provide a heat pump system of improved construction and mode of operation. A further object is to provide a highly efficient heat pump system which is simple in construction and dependable in use. A further object is to provide such a system with simplified control, which may utilize electric power for heating and cooling a conditioned space. A further object is to provide such a system which utilizes a stream of water as the heat source, and also as the medium to which heat is dissipated during cooling operation. These and other objects will be in part obvious, and in part pointed out below.

In the drawing the single figure is a schematic representation of one embodiment of the invention.

The illustrative embodiment of the invention comprises a system which is adapted to heat or to cool a conditioned space utilizing a stream of water as the source of heat during heating operation, and as the eventual cooling medium during cooling operation. In this system, a heat exchange unit 2 has air directed through it by a fan 4 to cool or heat the air as the case may be, and the air is then discharged into the conditioned space.

The system also has a compressor 6, a condenser-receiver formed by a tank 8 and a water coil 14 therein, and an auxiliary evaporator 10. The compressor discharges compressed refrigerant gas through a line 12 to the top central portion of tank 8. Coil 14 within the tank is adapted to have water flow therethrough, thus to condense the gaseous refrigerant during the cooling operation. The condensed liquid refrigerant collects in the bottom of tank 8. Extending from the lower right-hand portion of tank 8 is a liquid refrigerant line 16 which connects to lines 22 and 34 having solenoid valves 18 and 20 therein, respectively.

Line 22 extends to an expansion valve 24, the other side of which is connected by a line 26 to the lower end of unit 2. The upper end of unit 2 is connected by a line 28 having a solenoid valve 30 therein to the intake line 32 of compressor 6. The second path for liquid refrigerant flow from tank 8 is through line 34, solenoid valve 20 and an expansion valve 36 to the auxiliary evaporator 10.

Evaporator 10 comprises a water tank 38 and a refrigerant coil 40 within the tank. Liquid refrigerant from expansion valve 36 enters the upper end of this coil and evaporates as it flows downwardly. The gaseous refrigerant returns to compressor 6 through a line 42, having a solenoid valve 44, and line 32. As explained more fully below, hot refrigerant gas flows during the heating cycle from the upper end of tank 8 through line 46 having a solenoid valve 48 to line 28. It then passes to evaporator 2 and out the bottom thereof through line 26, a line 50 and line 16 to the bottom of tank 8. A check valve 52 is provided in line 50 to prevent refrigerant flow, except in the direction from line 26 to line 16.

The water coil 14 in tank 8 receives water at its lower end from a line 54 leading from a water main 56. A normally-closed solenoid valve 58 in line 54 has its solenoid energized to open the valve and provide the flow of water through coil 14, as desired. The water flows freely through coil 14, and is disposed of in any suitable way, for example in a diffusion well. Water is supplied to tank 38 of evaporator 10 by a line 60 having a normally-closed solenoid valve 62 therein and likewise leading from main 56. This water flow is controlled and the outlet water is disposed of in the same way as with coil 14 of tank 8.

When the system is used for heating, valves 18 and 30 in the refrigerant lines 22 and 28 and valve 58 in water line 54 are closed, while valves 20, 44, and 48 in the refrigerant lines 34, 42, and 46 and valve 62 in water line 60 are open. Hot refrigerant gas from the compressor passes into tank 8, but valve 58 in water line 54 is closed and no water is flowing through coil 14, and this gas is not cooled and condensed. The hot gas therefore passes from tank 8 through lines 46 and 28 to and down through unit 2. As the refrigerant passes through this coil it is cooled and condensed by the cooling action of the air passing over this coil. That is, the air extracts heat from the refrigerant so that the air is heated.

Condensed refrigerant flows from unit 2 through line 26, thence down through line 50 and to the left through line 16 to the bottom of tank 8. The lower portion of the tank serves as a receiver for liquid refrigerant.

Refrigerant from line 50 also flows to the right through line 16 and upwardly and to the left through line 34 and then down through expansion valve 36 to the top of coil 40. As indicated above, valve 62 in line 60 is open at this time so that water is being circulated through tank 38, and valve 44 is open so coil 40 is at the suction pressure. Therefore, the refrigerant is evaporated in coil 40 and it extracts heat from the water. The gaseous refrigerant flows from the bottom of coil 40 through lines 42 and 32 back to the compressor. The directions of refrigerant and water flow in the various lines of the system during heating are indicated in the drawing by double-headed arrows.

Evaporator 10 has a safety controller 64 which turns off the system in the event that the water temperature within it approaches 32° F. This prevents freezing under extremely cold conditions of operation or if the water supply should fail. The compressor is provided with safety controls and a high-pressure relief valve.

When the system is used for cooling, valves 18 and 30 in refrigerant lines 22 and 28 and valve 58 in water line 54 are open, while valves 20, 44, and 48 in refrigerant lines 34, 42, and 46 and valve 62 in water line 60 are closed. Hot refrigerant gas from compressor 6 is pumped into tank 8 where it is condensed by the cooling action of the water flowing through coil 14. Condensed liquid refrigerant flows out the bottom of tank 8 via lines 16 and 22, expansion valve 24 and line 26, to unit 2. Here, it is evaporated and the warm air blowing past the unit is cooled and dehumidified. The refrigerant flows to compressor 6 through lines 28 and 32. The directions of refrigerant and water flow in the various lines of the system during cooling are indicated in the drawing by single-headed arrows.

A simple arrangement for selecting the function to be performed by this embodiment of the invention comprises a double-pole, double-throw switch 66. This switch can be set manually to a position wherein it energizes and thereby opens solenoid valves 18, 30, and 58 for the cooling operation or to a position wherein it energizes and thereby opens solenoids 20, 48, 44, and 62 for the heating operation, all solenoid valves in their unenergized state being closed. The power supply leads to switch 66 are connected through safety controller 64 and a main power switch 67 to a power line (not shown).

The above description is intended in illustration and not in limitation. Various changes and modifications in the arrangement shown may occur to those skilled in the art and these may be made without departing from the spirit or scope of the invention as set forth.

I claim:

1. A refrigeration system comprising, the combination of, a compressor, a condenser-receiver unit which is adapted to condense refrigerant and includes means to pass water into heat exchange relationship with the refrigerant and means to receive compressed refrigerant from said compressor and also to store liquid refrigerant, a heat transfer unit which is adapted to subject air to a heat transfer operation with respect to refrigerant, means including a pressure reducer to deliver liquid refrigerant from said condenser-receiver unit to said heat transfer unit at a reduced pressure and to provide for the flow of gaseous refrigerant therefrom to said compressor, an auxiliary evaporator which is connected to receive liquid refrigerant from said condenser-receiver unit at a reduced pressure and including means to pass water into heat exchange relationship with the refrigerant, means including a solenoid valve which is opened to connect said auxiliary evaporator to said compressor, means including solenoid operated valve which may be operated to connect the gas outlet from said compressor directly to said heat transfer unit and to close the connection between said heat transfer unit and said compressor, means to direct a liquid refrigerant from said heat transfer unit to said condenser-receiver unit, and water flow control means to selectively control the supplying of water to said condenser-receiver unit or to said auxiliary evaporator.

2. A system as described in claim 1, wherein said heat transfer unit comprises a coil unit and a motor-driven fan to direct air therethrough.

3. A system as described in claim 1 which includes, a soelnoid valve which is opened to provide for the flow of liquid refrigerant to said auxiliary evaporator.

4. A system as described in claim 1 which includes, an electric control system having one circuit which is energized to provide for the evaporation of refrigerant in said heat transfer unit, and another circuit which is energized to provide for the evaporation of refrigerant in said auxiliary evaporator.

References Cited in the file of this patent
UNITED STATES PATENTS

| | | |
|---|---|---|
| 1,969,187 | Schutt | Aug. 7, 1934 |
| 2,266,238 | Newton | Dec. 16, 1941 |
| 2,549,747 | Leeson | Apr. 17, 1951 |
| 2,645,101 | La Porte | July 14, 1953 |